United States Patent [19]

Lee

[11] Patent Number: 4,930,148
[45] Date of Patent: May 29, 1990

[54] HEADBAND RADIOPHONE COMBINATION SET

[76] Inventor: Hsiao-Chung Lee, 3F1., No. 77-8, Jenn Chien Street, Shu Lin Town, Taipei Hsien, Taiwan

[21] Appl. No.: 425,672

[22] Filed: Oct. 23, 1989

[51] Int. Cl.⁵ .............................................. H01Q 7/04
[52] U.S. Cl. ...................................... 379/58; 455/90; 379/430; 379/61; 381/74
[58] Field of Search ...................... 379/58, 61, 63, 62, 379/369, 370, 430, 457; 455/89, 90; 381/74

[56] References Cited

U.S. PATENT DOCUMENTS

| | | | |
|---|---|---|---|
| 4,340,972 | 2/1982 | Heist | 455/39 |
| 4,357,711 | 11/1982 | Drefko et al. | 455/89 |
| 4,392,243 | 7/1983 | Ohhashi et al. | 455/74 |
| 4,412,106 | 10/1983 | Pavel | 455/89 |
| 4,484,029 | 11/1984 | Kenny | 379/61 |
| 4,591,661 | 5/1986 | Benedetto et al. | 379/61 |
| 4,621,372 | 11/1986 | Relyea | 455/74 |
| 4,654,883 | 3/1987 | Iwata | 455/89 |
| 4,682,363 | 7/1987 | Goldfarb et al. | 381/74 |
| 4,833,726 | 5/1989 | Shinoda et al. | 455/89 |
| 4,845,751 | 7/1989 | Schwab | 381/25 |

*Primary Examiner*—Robert Lev
*Attorney, Agent, or Firm*—Asian Pacific International Patent and Trademark Office

[57] ABSTRACT

A headband radiophone combination set uses a control circuit and a receiver-transmitter circuit to reciprocally transmit or receive signal through an antenna to communicate with the antenna and the receiver-transmitter circuit of a main switching unit for internal, external and regular alternative telecommunication.

7 Claims, 10 Drawing Sheets

4,930,148

HEADBAND RADIOPHONE COMBINATION SET

BACKGROUND OF THE INVENTION

The present invention is related to a headband radiophone combination set. In recent years, following improvements in the standard of living, the demand for telecommunication is becoming greater. Conventional mobile telephone apparatus is generally comprised of a portable main switching unit with a line-connected hand set connected thereto for receiving or sending a signal. Although regular mobile telephone apparatus is portable, the apparatus is still very heavy and inconvenient to carry for long periods. According to statistics, a person will feel uncomfortable and experience aching of the hands or neck when carrying a mobile telephone apparatus for use more than ten (10) minutes. Further, conventional mobile telephone apparatus cannot be conveniently used in noisy places, for example, in public places, machinery plants, retail stores, or any place where a large number of persons are gathered together. It is therefore within the scope of the present invention to provide a headband radiophone for telecommunication within an effective receiving and transmitting range requiring the person to carry a main switching unit.

SUMMARY OF THE INVENTION

The main object of the present invention is to provide such a headband radiophone combination set which can be used for convenient telecommunication within effective range without requiring the person to carry the main switching unit.

Another object of the present invention is to provide such a headband radiophone combination set which can be alternatively used for single-earphone or double-earphone applications.

A yet further object of the present invention is to provide such a headband radiophone combination set which can be electrically charged by an independent charger.

To fulfill the above and other objects, a headband radiophone according to the invention includes a headband radiophone comprising a miniature antenna, a control circuit and a receiver-transmitter circuit to match with a main switching unit within an effective range for telecommunication, in which the charging board of the headband radiophone comprises vertical charging holes as well as horizontal charging holes to respectively fit in with different mobile telephone sets or independent chargers for electric charging in different directions.

BRIEF DESCRIPTION OF THE DRAWINGS

These and other objects and and features of the invention will become more apparent from the following description taken in connection with the accompanying drawings wherein.

DETAILED DESCRIPTION OF THE PREFERRED EMBODIMENTS

Figure 1:
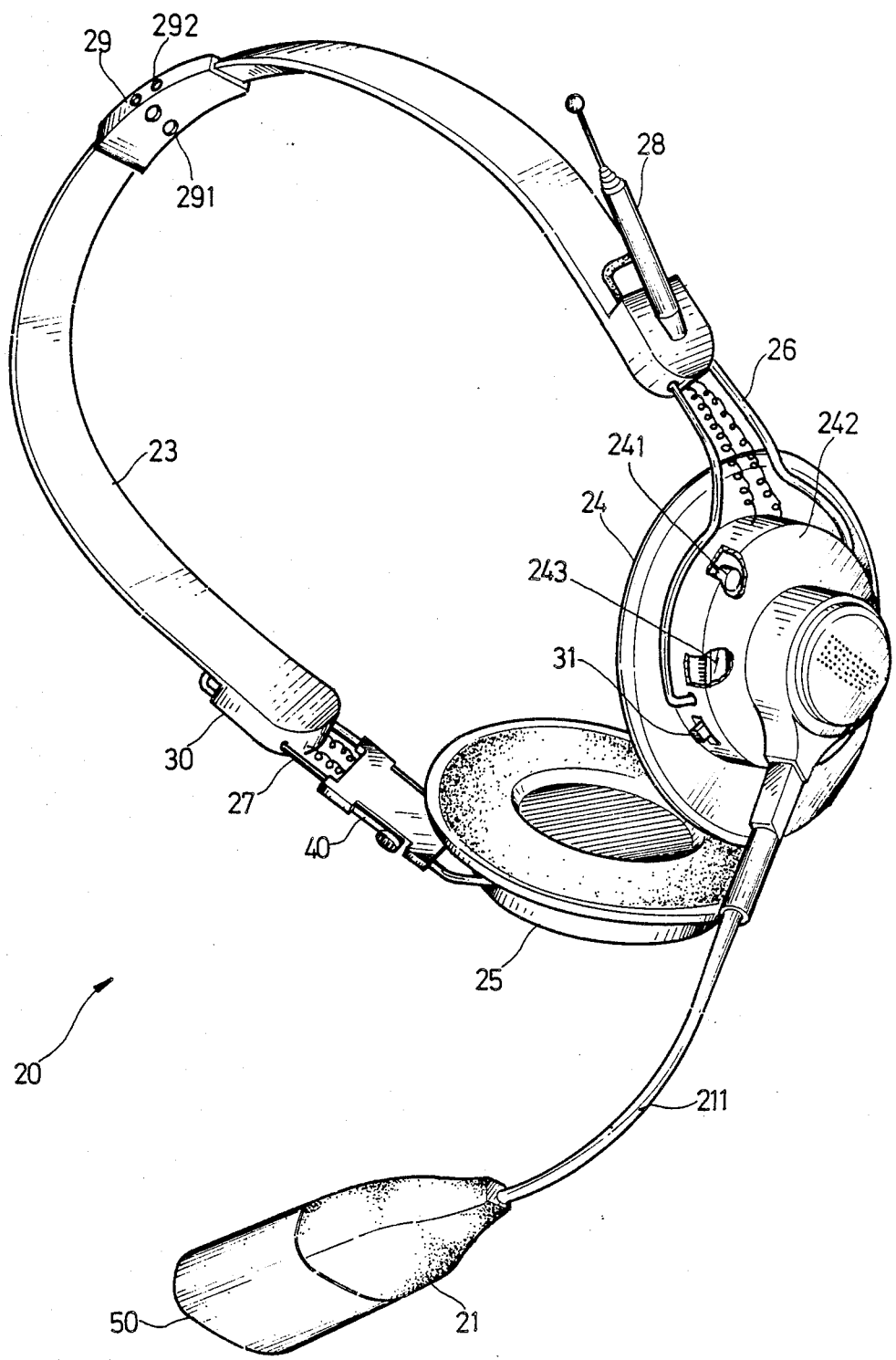
FIG. 1 is a perspective view of a headband radiophone embodying the present invention.

Referring to FIG. 1, therein illustrated is a headband radiophone (20) embodying the present invention and generally comprised of a mouthpiece (21), a mouthpiece link (211), a circular supporting band (23), a main earphone (24), a control circuit (241), a receiver-transmitter circuit (243), an auxiliary earphone (25), two adjusting bars (26) and (27), a miniature antenna (28), a charging board (29), a ringer (30), a volume control knob (31), a rapid connection (40), and a recoverable keyboard (50). The earphones (24) and (25) may be adjusted on the circular supporting band (23), by means of the adjusting bars (26) and (27), according to the size of user's head. The two earphones (24) and (25) may be collectively used, according to user's requirement, or the auxiliary earphone (25) may be removed therefrom by disconnecting the rapid connection (40), with the main earphone (24) remaining attached to the circular supporting band (23) for service. Because the mouthpiece (21) is pivoted to the housing (242) of the main earphone (24) by means of the mouthpiece link (211), after a decision is made on the use of single earphone or double-earphone, the main earphone (24) may be set at the left or right side according to personal preference by means of adjusting the mouthpiece link (211) when it is put on one's head. The charging board (29) comprises vertical charging (291) as well as horizontal charging holes (292) for convenient connection thereto of different type of chargers for electric charging process.

Figure 2:
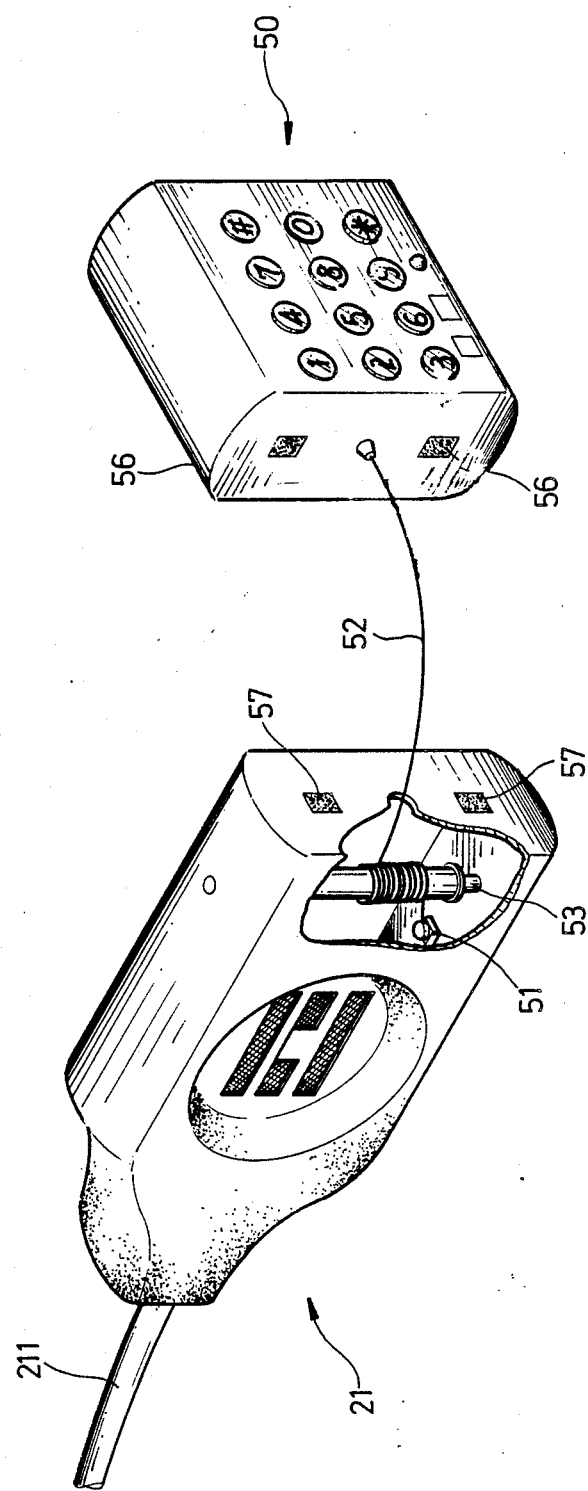
FIG. 2 is a perspective view illustrating the movable keyboard taken out of the receiver that forms part of the FIG. 1 apparatus.
Figure 3:
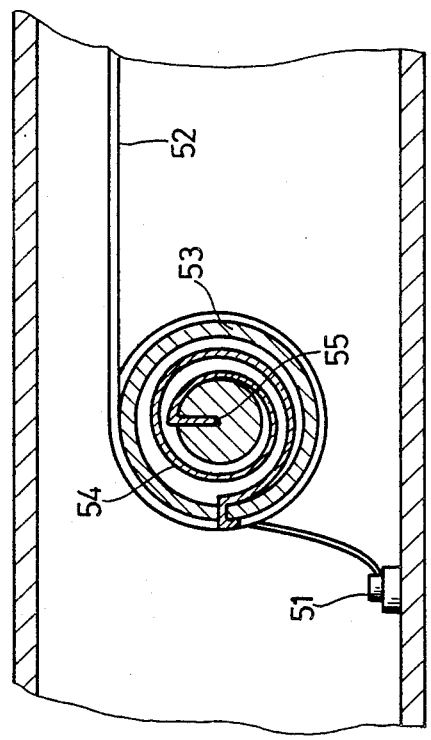
FIG. 3 is a schematic drawing illustrating the structure of a reel used with the recoverable keyboard shown in FIG. 2.

Referring to FIGS. 2 and 3, the recoverable keyboard (50) is movably connected with the mouthpiece (21) by means of a cord (52). The cord (52) has one end connected to the keyboard (50); the other end of the cord winds around a reel (53) in the mouthpiece (21) and to the inner bottom surface of the mouthpiece (21) via a clamping means (51). The reel (53) has a spiral spring (54) set therein, which spiral spring (54) has one end firmly retained in a locating notch (55) on the central axis of the reel (53) and the other end fixedly connected to the reel (53). When the cord (52) is pulled to extend outward, the spiral spring (54) in the reel (53) is simultaneously tightened. As soon as the pulling force is released from the cord (52) after operation of the keyboard, the spring force of the spiral spring (54) immediately causes the reel (53) to take up the cord (52). By means of the attractive force between the keyboard (50) and the mouthpiece (21) or any fastening means set therebetween (e.g. (56) is a magnet and (57) is an iron plate), the keyboard (50) is directly attached to the mouthpiece (21).

Figure 4:
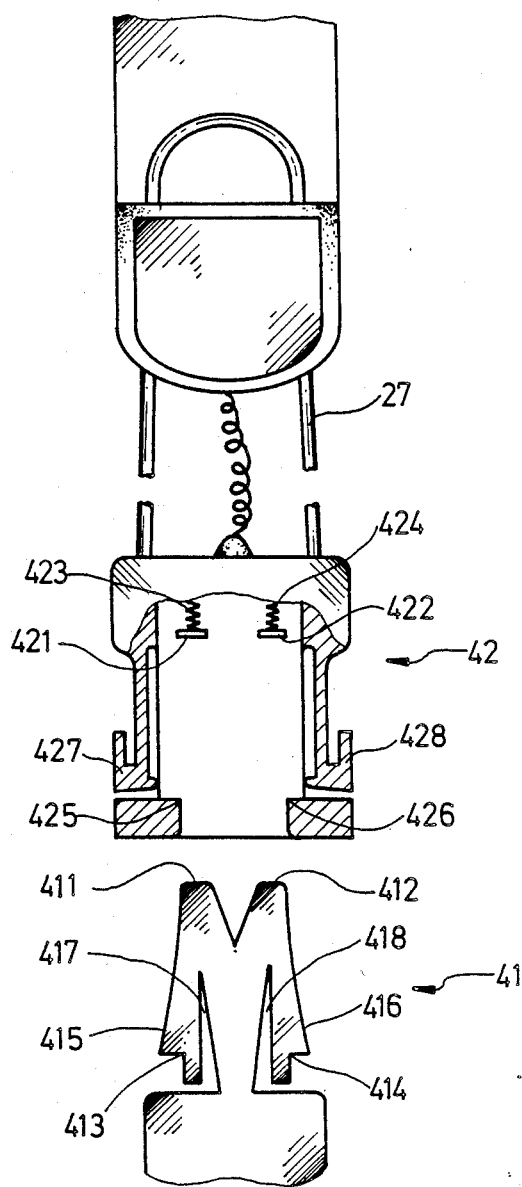
FIG. 4 is a sectional view of a rapid connection assembly according to the present invention.

Referring to FIG. 4, the rapid connection (40) is generally comprised of a male member (41), which is fixedly mounted on the auxiliary earphone (25), and a female member (42), which is fixedly mounted on the adjusting bar (27). Two notches (417) and (418) in the male member (41) permit member (41) to be inserted into the female member (42) with the edges (413) and (414) of the male member (41) respectively stopped at the edges (425) and (426) and with the front contact ends (411) and (412) flexibly stopped against the contact surfaces (421) and (422) of the female member (42). The two contact surfaces (421) and (422) are respectively supported by spring means (423) and (424) to secure good contact of the contact surfaces (421) and (422) with the contact ends (411) and (412). To remove the auxiliary earphone (25) from the circular supporting band (23), the female member (42) is squeezed inward with the person's fingers on the bilateral knobs (427) and (428) to force the bilateral slopes (415) and (416) to move inward so as to further let the edges (413) and (414) be disengaged from the edges (425) and (426); thus, the male member (41) and the female member (42) can be easily separated from each other and the auxiliary earphone (25) can be simultaneously removed from the circular supporting band (23). According to the present invention, the female member (42) is covered with one layer of sponge at the inner side to make it comfortable when it is directly attached to user's head while the auxiliary earphone (25) is removed and not in use.

Figure 5:
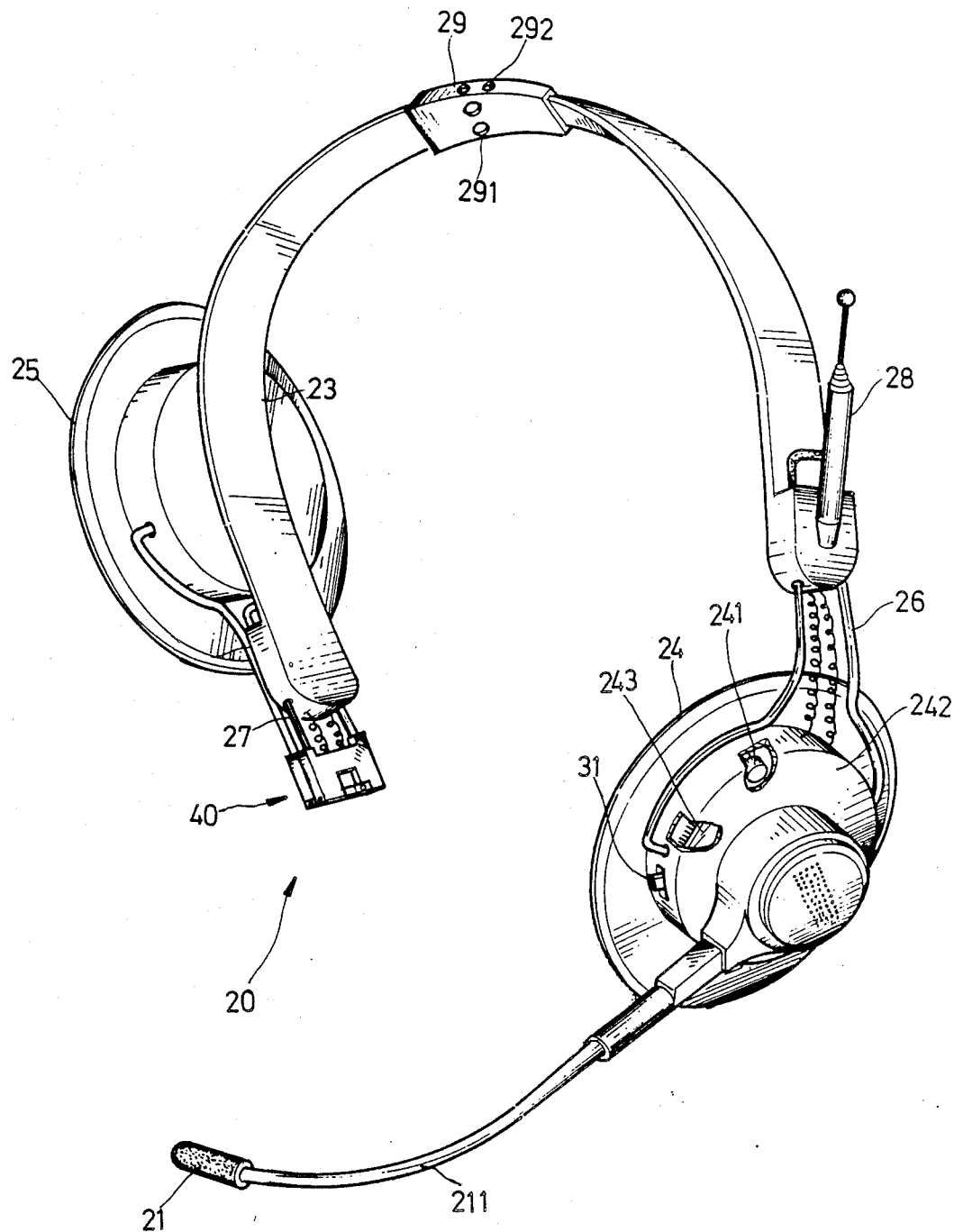
FIG. 5 illustrates another embodiment of headband radiophone constructed according to the present invention.

Referring to FIG. 5, therein illustrated is an alternate form of a headband radiophone (20') constructed according to the present invention. In this embodiment, the headband radiophone (20') serves as a receiver only and does not comprise any mouthpiece or keyboard. Instead of the rapid connection (40) used in aforementioned embodiment, a collapsible connection (40') is used to collapsibly connect the auxiliary earphone (25) to the circular supporting band (23). Therefore, the auxiliary earphone (25) may be turned up with its back side attached to the circular supporting band (23) by means of magnetic action or any fastener means, when it is not in use or not suitable for use under certain condition (for example, during driving), to prevent from dropping.

Figure 6:
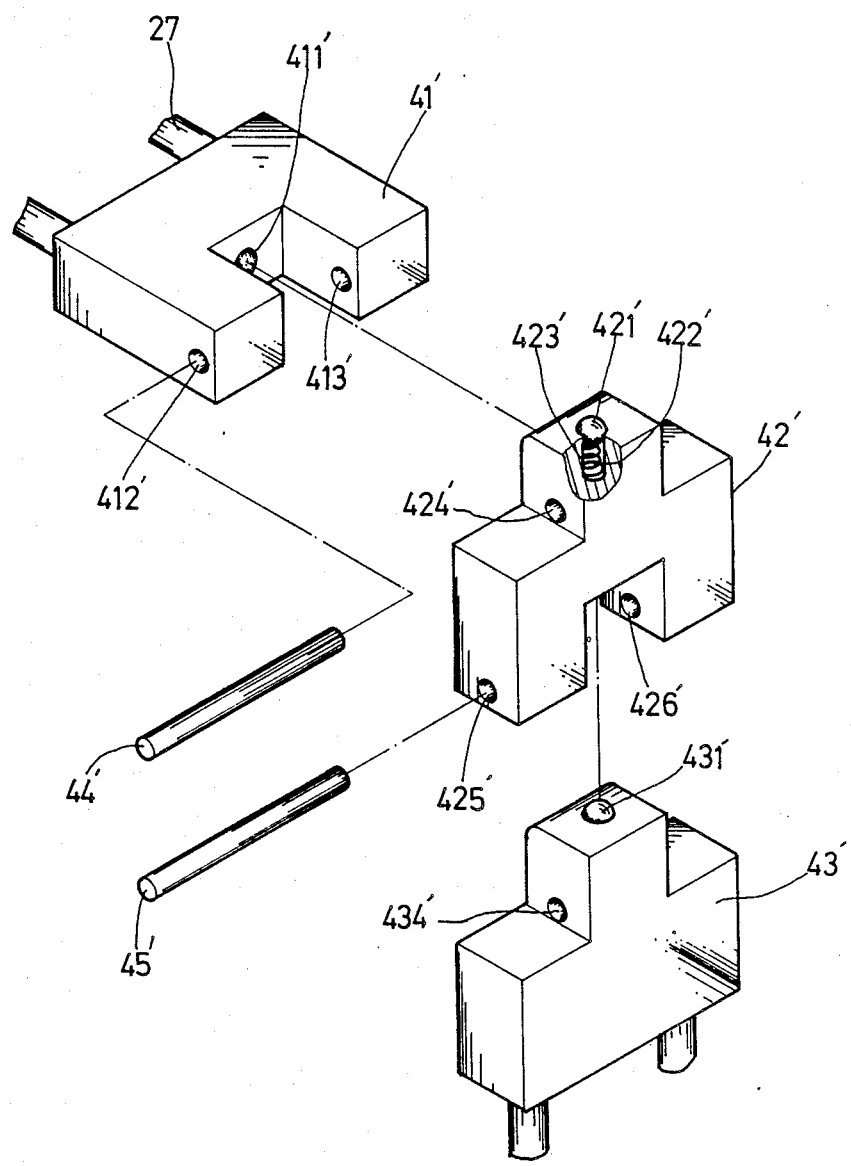
FIG. 6 is a perspective fragmentary view of a collapsible connection used in the FIG. 5 assembly.

Referring to FIG. 6, the collapsible connection (40') is generally comprised of an upper notched block (41'), a middle convex head block (42'), a lower convex head block (43') and two pivot pins (44') and (45'), wherein the upper notched block (41') is fixedly mounted on the adjusting bar (27), and the lower convex head block (43') is fixedly connected with the auxiliary earphone (25). The pivot pin (44') extended through the hole (412') of the upper notched block (42') and the hole (424') of the middle convex head block (42') into the hole (413') of the upper notched block (41'); the pivot pin (45') is inserted through the hole (425') of the middle convex head block (42') and hole (423') of the lower convex head block (43) into the hole (426') of the middle convex head block (42'). The linear positioning of the middle convex head block (42') against the upper notched block (41') is made by means of a spring (422') and a circular ball (421') which are fixedly set in the notch (423') of the middle convex head block (42'). When the upper notched block (41') and the middle convex head block (42') are arranged in line, the circular ball (421') is pushed by the spring (422') to seat in a circular recess hole (411'), which is made on the upper notched block (41') opposite to the notch (423') of the middle convex head block (42'), to reinforce the linear connection. When a bending force is applied on the collapsible connection (40') to collapse the auxiliary earphone (25), the circular recess hole (411) immediately forces the circular ball (421') to break away from the circular recess hole (411') to permit the middle convex head block (42') to have a pivotal motion against the upper notched block (41'). Similar mechanism is provided between the middle convex head block (42') and the lower convex head block (43') to permit them to have a pivotal motion against each other. Through the said mechanism, the auxiliary earphone (25) can be easily collasped.

Figure 7:
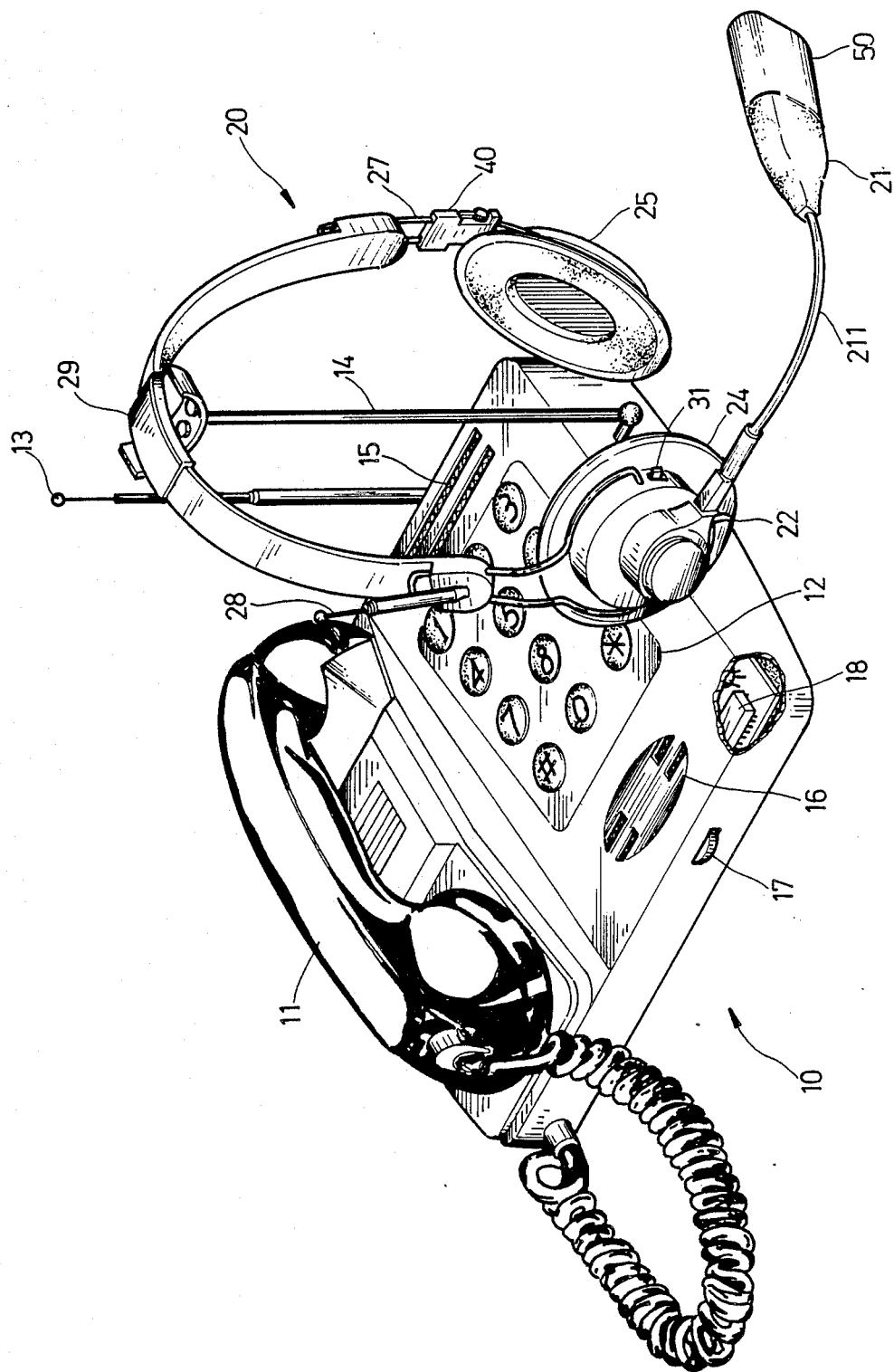
FIG. 7 illustrates a device of the present invention used with a regular wireless prestafone set.
Figure 8:
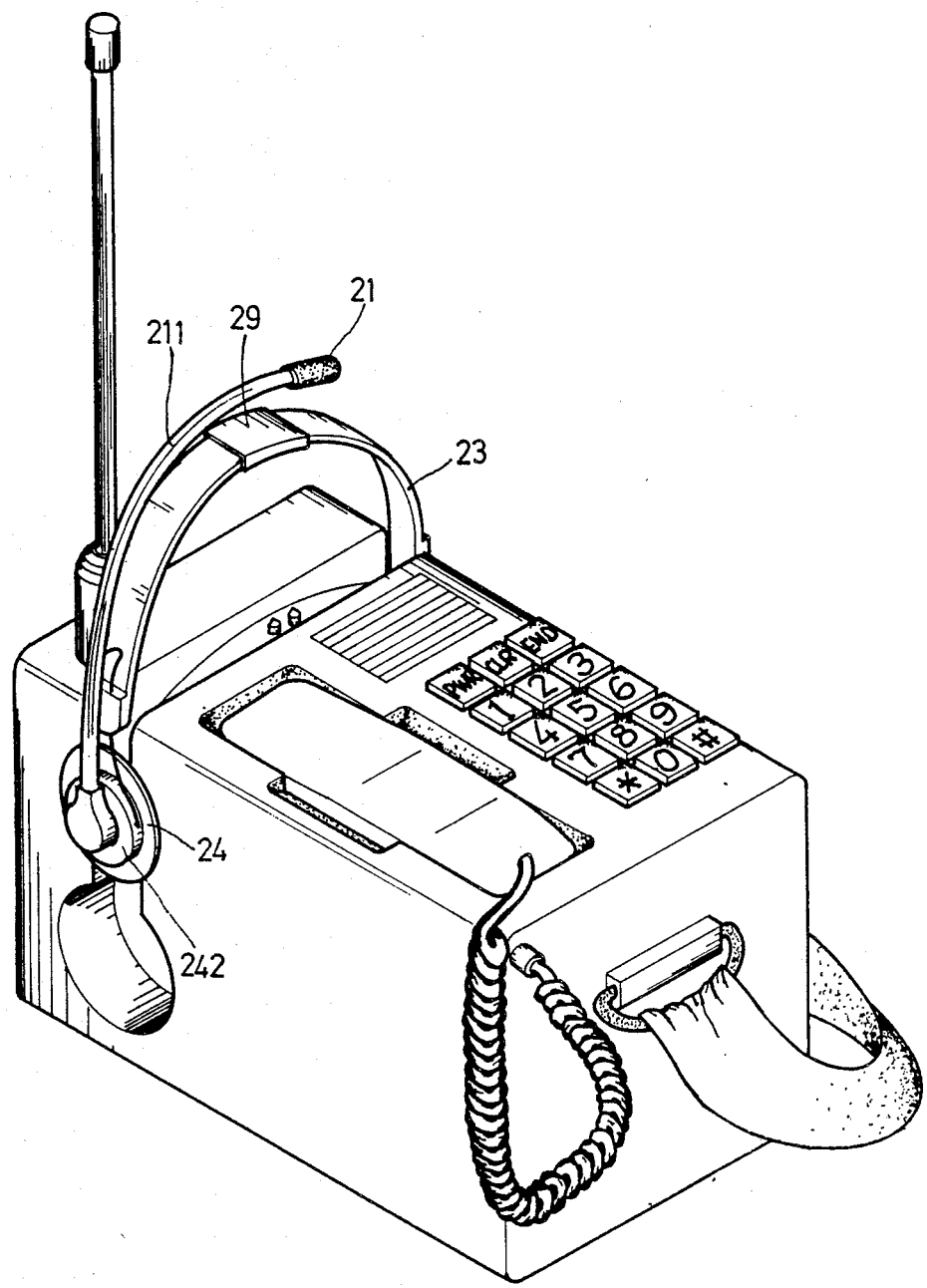
FIG. 8 illustrates an embodiment of the present invention used with a mobile telephone set.
Figure 9:
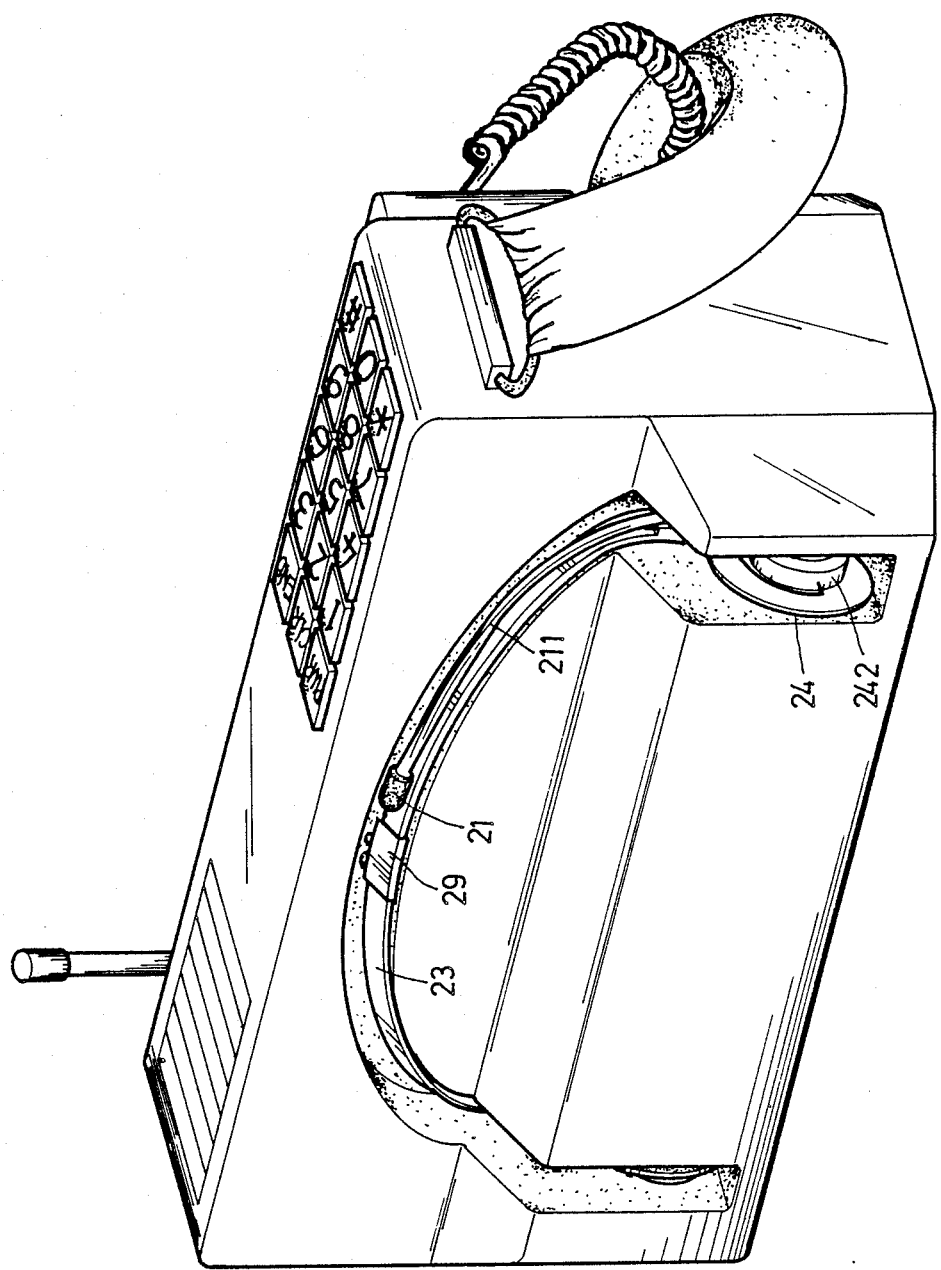
FIG. 9 illustrates another embodiment of headband radiophone adapted to match with a mobile telephone set.
Figure 10:
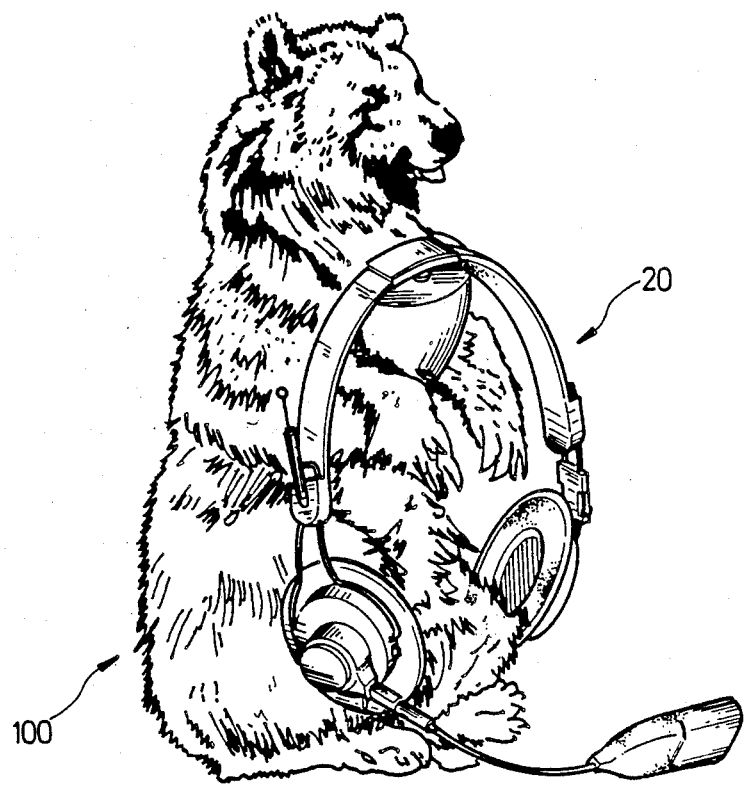
FIG. 10 illustrates a headband radiophone of the present invention mounted on an animal-shaped independent charging system for rapid charging.

Referring to FIGS. 7 through 9, therein illustrated are examples of the use of the present invention to match with a regular prestafone or mobile telephone set. As illustrated in FIG. 7, the wireless prestafone (10) comprises a line connected hand set (11), an input key portion (12), an antenna (13), an arm support charger (29), a receiver (15), a mouthpiece (16), a volume control knob (17), and a receiver-transmitter circuit (18). The system may be electrically charged through the vertical charging holes (291) of the charging board (29). In FIG. 8 as well as in FIG. 9, a headband radiophone (20) of the present invention is used to match with a mobile telephone set. In order to make charging easy, the charging board (29) provides vertical charging holes (291) and horizontal charging holes (292) to respectively fit different types of telephone sets. In manufacturing a headband radiophone of the present invention, the recoverable keyboard may be eliminated so that the headband radiophone may be served simply as a receiver to receive specific signals from outside and not to be used as a signal transmitter.

It is apparent that various modifications could be made to the present invention without departing from the basic teachings thereof.

What is clamed is:

1. A headband radiophone combination set, including comprising:

a headband radiophone including a circular supporting band having mounted thereon a charging board, a miniature antenna and a ringer and having connected thereto a first and a second adjusting bar respectively at both ends a main earphone having set therein a control circuit, a receiver-transmitter circuit, and a volume control knob, and being pivotably connected with a mouthpiece link at one end and fixedly connected with said first adjusting bar at the other end, an auxiliary earphone connected to said second adjusting bar by means of a connection, a mouthpiece fixedly connected to said mouthpiece link, and a keyboard movably connected to said mouthpiece; and a main switching unit, comprising an input key portion for signal input, a receiver and a mouthpiece and a hand set for communication, a volume control knob for volume control, a receiver-transmitter circuit and an antenna for transmitting signal input through said input key portion to said headband radiophone;

characterized in that said headband radiophone uses its control circuit, receiver-transmitter circuit and miniature antenna to reciprocally communicate with the antenna and the receiver-transmitter circuit of said main switching unit for internal, external or regular alternative telecommunication.

2. The headband radiophone combination set as set forth in claim 1, wherein said connection which connects said auxiliary earphone to said second adjusting bar may be a separable rapid connection or a connection which is not separable but collapsible to bend upward.

3. The headband radiophone combination set as set forth in claim 1, wherein said charging board comprises charging holes horizontally as well as vertically to fit in with chargers for charging in different direction.

4. The headband radiophone combination set as set forth in claim 1, wherein said headband radiophone may be charged by said main switching unit or by an independent charger.

5. The headband radiophone combination set as set forth in claim 1, wherein said keyboard may be eliminated from said headband radiophone so that said headband radiophone may exclusively serve as a receiver to specifically receive outside signal.

6. The headband radiophone combination set as set forth in claim 1, wherein said main switching unit is a regular home use wireless prestafone.

7. The headband radiophone combination set as set forth in claim 1, wherein said main switching unit is a mobile telephone set.

* * * * *